No. 858,392. PATENTED JULY 2, 1907.
C. E. HITE.
PRIMARY BATTERY.
APPLICATION FILED DEC. 28, 1905.
2 SHEETS—SHEET 2.
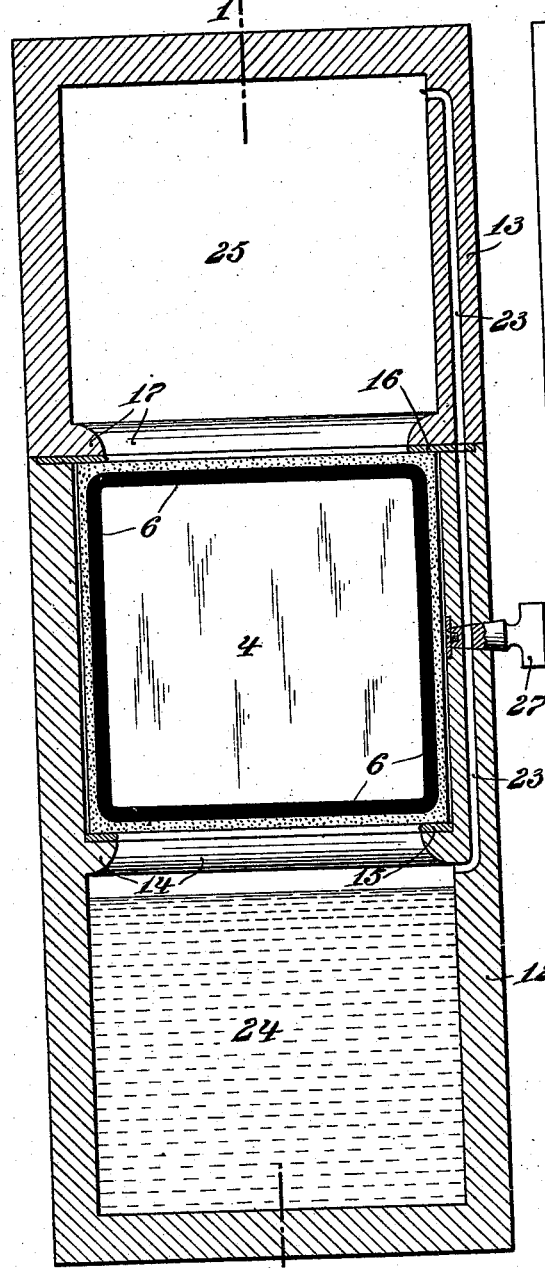
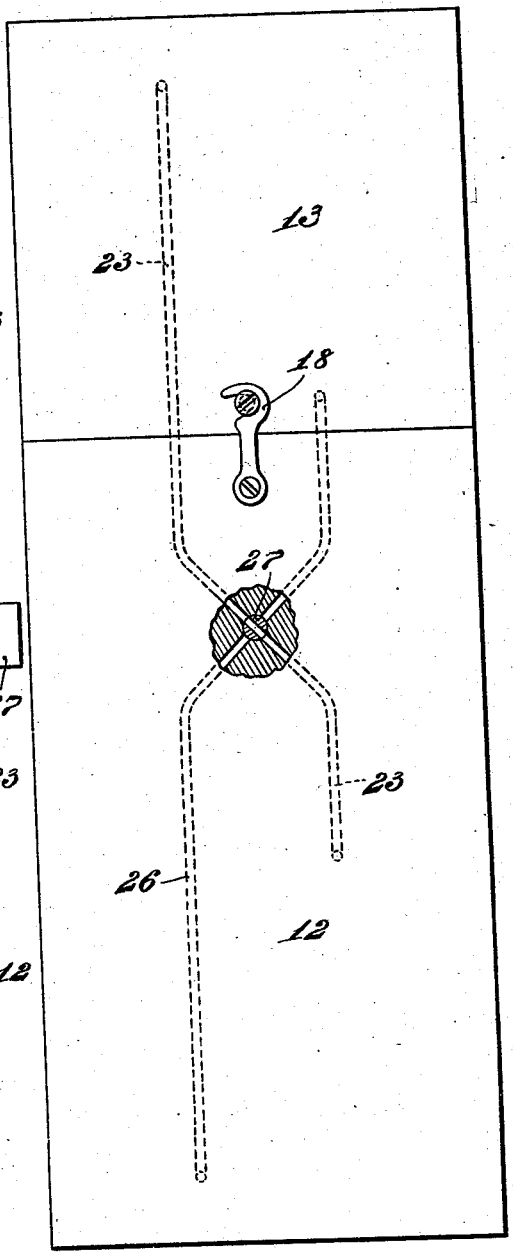

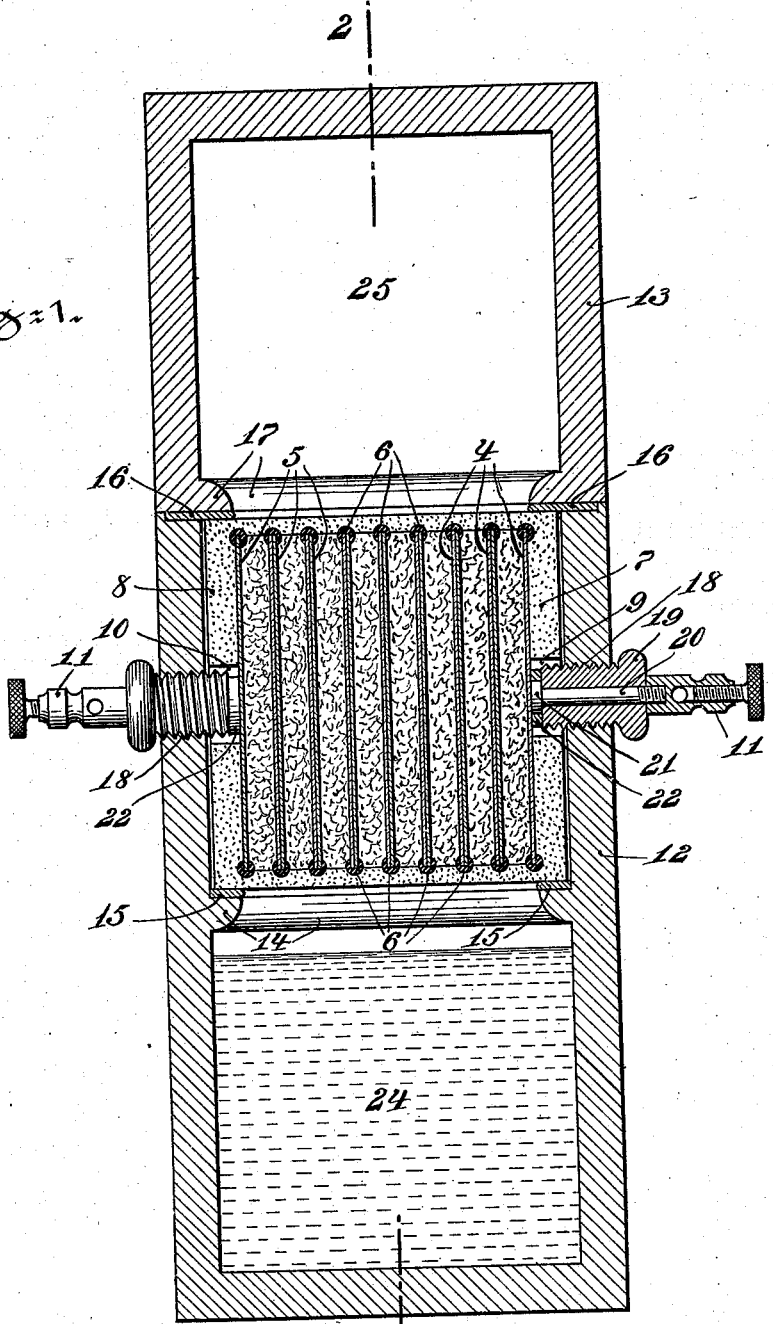

UNITED STATES PATENT OFFICE.

CHARLES E. HITE, OF BURLINGTON, NEW JERSEY, ASSIGNOR TO HITE ELECTRIC COMPANY, A CORPORATION OF DELAWARE.

PRIMARY BATTERY.

No. 858,392.        Specification of Letters Patent.        Patented July 2, 1907.

Application filed December 28, 1905. Serial No. 293,579.

*To all whom it may concern:*

Be it known that I, CHARLES E. HITE, a citizen of the United States, residing at Burlington, in the county of Burlington and State of New Jersey, have invented a new and useful Primary Battery, of which the following is a specification.

My invention relates to improvements in primary batteries.

My invention relates especially to improvements in batteries of the percolating type.

The object of my invention is to produce a high potential cell or battery of compact form, and comprises means for arranging and associating the electrodes, and to cause a slow or gradual movement of an electrolyte by percolation between said electrodes.

My invention comprises improved means for assembling and insulating pairs of electrodes of opposite polarity, improved means for assembling said electrodes, and improved means for storing electrolyte and passing the same over the surface of the electrodes by percolation.

My invention also includes improvements in details of battery or cell construction.

Referring to the drawings:—Figure 1 is a vertical section on 1, 1 of Fig. 2. Fig. 2 is a transverse vertical section on 2, 2 of Fig. 1. Fig. 3 is an elevation with a portion broken away.

Similar numerals refer to similar parts throughout the several views.

The plates or electrodes 4 and 5, which may be, for example, of zinc or copper respectively, are soldered together back to back. Their edges are then dipped in an insulating substance 6 such, for example, as melted resin and plaster of paris mixed together, forming an insulating rim around its edges. The pairs of electrodes are then assembled parallel with each other, but spaced apart, as shown in Fig. 1, with the exception that the zinc electrode 4 on the right and the copper electrode 5 on the left, are single sheets, serving as terminal electrodes. The spaces between the pairs of electrodes and the two terminal electrodes are filled with a depolarizing material such, for instance, as copper oxid or $MnO_2$, asbestos fiber and Portland cement in proper proportions.

The electrodes and the composition form together a compact mass, porous between the electrodes. This mass is then covered on all sides by a coating of asbestos fiber and Portland cement in proper proportions. The two opposite sides 7 and 8 of this outer coating are apertured as at 9 and 10 to leave the terminal plates 4 and 5 exposed, so as to be connected electrically with the binding posts 11. The complete body formed of the electrodes, the packing between them, and the surrounding coating of porous material when hard, is a substantially solid cube or block, which we will call the electrode element. The vessel or cell 12 may be formed of any suitable material, such as metal, wood, or other substance having an inner surface of acid resisting material. This vessel 12 is provided with the lid 13 hinged to it in the usual way. The interior of vessel 12 is provided with the flange 14 for supporting said block or battery element, the gasket 15 being inserted between said flange and block. Upon the top of battery element or block is placed a second gasket 16. The lower edge of lid 13 is provided with the flange 17, which, when the lid is closed and held in the closing position by a suitable fastener such as hook 18, see Fig. 3, the flange 17 presses tightly against gasket 16, and secures the electrode element or block in position. The sides of the outer walls of receptacle or cell 12 are provided with threaded apertures 18 registering with the apertures 9 and 10. Through these threaded apertures 18 are threaded the plugs 19. Through the center of each plug 19 passes the contact rod 20 connected with binding post 11 and having the enlarged head 21 for contacting with the terminal plate. Surrounding this enlarged head 21 is a gasket of rubber or other yielding material of greater thickness than said head 21, so that when the plug 19 is screwed inwardly the gasket 22 is compressed and spreads out to form a packing about head 21, while head 21 comes in contact with the terminal electrode. By turning the plug 19 in the opposite direction, the head 21 is brought away from contact with the terminal electrode.

The method of assembling the elements is as follows: Into the lower part of cell or receptacle 12 is poured the electrolyte up to the flange 14. The electrode element or block is then inserted, so as to rest upon the gasket 15 resting on flange 14. The gasket 16 is then put in position, and the lid 13 closed and locked. The plugs 19 are then screwed into position, so that ends 21 of contact rods 20 come in contact with electrodes 4 and 5. The whole is then inverted, and the electrolyte percolates gradually through the porous covering of asbestos and cement, and works its way downward through the depolarizing porous material between the electrodes, coming in contact with the faces of the couples, thereby setting up the electric current, which is taken from the cell at the terminal binding posts 11. The porosity of the electrode block is such that it will take from 2 to 4 hours for the liquid or electrolyte to pass from the upper to the lower chamber. If the cell is required to operate longer, it is again inverted and the operation repeated.

In order that the circulation or percolation may not be hindered by air compressing in the lower chamber, I provide the channel 23, see Figs. 2 and 3, which conducts the air from the upper part of chamber 24 to the upper part of chamber 25. A similar channel 26 is provided when the cell is reversed, these channels crossing each other and controlled by the by-pass cock 27. These passages 23 and 26 may also be used for allowing the liquid or electrolyte to pass from the upper chamber to the lower chamber around the electrode block when it is desired to render the battery inactive. This, of course, is controlled also by the by-pass cock 27.

It is obvious that I do not confine myself to any particular shape of electrode block, nor to any particular materials for my electrodes, or for my electrolyte.

What I claim is:—

1. The combination of a plurality of pairs of electrodes packed in depolarizing porous material, and incased in a coating of porous material adapted, when hard, to form the said elements into a solid block, means for making connection with the terminal electrodes and means for passing by percolation an electrolyte through said electrode block.

2. An electrode block composed of an outer covering of porous material adapted to become hard when dry, a plurality of pairs of electrodes surrounded thereby each pair of electrodes soldered together back to back and incased in a frame of insulation around their edges and a packing of depolarizing porous material between said pairs of electrodes.

3. In combination with a receptacle a removable electrode block composed of an outer covering of porous material adapted to become hard when dry, a plurality of pairs of electrodes surrounded thereby each pair of electrodes soldered together back to back and incased in a frame of insulation around their edges and a packing of depolarizing porous material between said pairs of electrodes.

4. In combination with a receptacle a removable electrode block composed of an outer covering of porous material adapted to become hard when dry, a plurality of pairs of electrodes surrounded thereby each pair of electrodes soldered together back to back and incased in a frame of insulation around their edges, a packing of depolarizing porous material between said pairs of electrodes and means for sealing the electrode block in the receptacle so as to leave a chamber above and below the block.

5. A primary cell comprising a receptacle for holding an electrolyte, an electrode block removably seated therein, said electrode block comprising a plurality of pairs of electrodes, and terminal electrodes, incased in a covering of porous material, and separated by a porous depolarizing material, and means for making contact with the terminal electrodes.

6. In combination with a receptacle a self-sustaining porous electrode block provided with a plurality of pairs of electrodes and terminal electrodes, separated by porous depolarizing material, each pair of electrodes being supported back to back and provided with a frame of insulating material.

7. In combination with a receptacle a self-sustaining porous electrode block provided with a plurality of pairs of electrodes and terminal electrodes, separated by porous depolarizing material, each pair of electrodes being supported back to back and provided with a frame of insulating material and means for removably supporting said electrode block in the receptacle, and sealing it therewith, so as to leave a chamber on either side of said block.

8. In combination with a receptacle a self-sustaining porous electrode block provided with a plurality of pairs of electrodes and terminal electrodes, separated by porous depolarizing material, each pair of electrodes being supported back to back and provided with a frame of insulating material, means for removably supporting said electrode block in the receptacle, and sealing it therewith, so as to leave a chamber on either side of said block, and a channel for conducting air around the electrode block from one chamber to the other, a channel for conducting liquid around the electrode block from one chamber to the other by gravity, and a by-pass cock for controlling said channels.

9. In combination with a receptacle a self-sustaining porous electrode block provided with a plurality of pairs of electrodes and terminal electrodes, separated by porous depolarizing material, each pair of electrodes being supported back to back and provided with a frame of insulating material and removable plugs with binding posts for establishing electrical connection between the binding posts and the terminal electrodes.

10. In combination with a receptacle a self-sustaining porous electrode block provided with a plurality of pairs of electrodes and terminal electrodes, separated by porous depolarizing material, each pair of electrodes being supported back to back and provided with a frame of insulating material, terminal binding posts, and plugs threaded in the walls of the receptacle adapted to establish electrical contact between binding posts and terminal electrodes.

CHARLES E. HITE.

Witnesses:
 EUGENE ZIEGLER,
 HOWARD S. OKIE.